(12) United States Patent
Gallagher (10) Patent No.: US 9,731,469 B2
(45) Date of Patent: Aug. 15, 2017

(54) FABRICATION PROCESS FOR GARMENTS AND OTHER FABRIC PRODUCTS

(71) Applicant: Cohesive Systems LLC, Mechanicsville, PA (US)

(72) Inventor: Joseph E. Gallagher, Mechanicsville, PA (US)

(73) Assignee: Cohesive Systems LLC, Mechanicsville, PA (US)

( * ) Notice: Subject to any disclaimer, the term of this patent is extended or adjusted under 35 U.S.C. 154(b) by 0 days.

(21) Appl. No.: 15/111,026

(22) PCT Filed: Jul. 10, 2014

(86) PCT No.: PCT/US2014/046142
§ 371 (c)(1),
(2) Date: Jul. 12, 2016

(87) PCT Pub. No.: WO2015/108564
PCT Pub. Date: Jul. 23, 2015

(65) Prior Publication Data
US 2016/0339664 A1 Nov. 24, 2016

Related U.S. Application Data

(60) Provisional application No. 61/927,677, filed on Jan. 15, 2014.

(51) Int. Cl.
*B32B 3/06* (2006.01)
*B32B 5/30* (2006.01)
(Continued)

(52) U.S. Cl.
CPC .................. *B32B 3/06* (2013.01); *B32B 5/30* (2013.01); *B32B 7/12* (2013.01); *B32B 7/14* (2013.01); *B32B 27/12* (2013.01); *B32B 27/18* (2013.01); *B32B 27/32* (2013.01); *B32B 27/322* (2013.01); *B32B 27/36* (2013.01); *B32B 27/40* (2013.01); *B32B 2262/0238* (2013.01); *B32B 2262/0246* (2013.01); *B32B 2262/0253* (2013.01); *B32B 2262/0261* (2013.01); *B32B 2262/0276* (2013.01); *B32B 2262/0292* (2013.01); *B32B 2264/0257* (2013.01); *B32B 2264/108* (2013.01); *B32B 2307/306* (2013.01); *B32B 2307/7265* (2013.01); *B32B 2307/73* (2013.01); *B32B 2437/00* (2013.01); *B32B 2471/02* (2013.01); *B32B 2555/02* (2013.01); *B32B 2571/00* (2013.01); *B32B 2601/00* (2013.01)

(58) Field of Classification Search
CPC ........................................................ B32B 3/06
USPC ....................... 156/308.4, 304.6, 290; 428/57
See application file for complete search history.

(56) References Cited

U.S. PATENT DOCUMENTS

3,953,566 A 4/1976 Gore
5,169,697 A 12/1992 Langley et al.
(Continued)

*Primary Examiner* — Jeff Aftergut
*Assistant Examiner* — Jaeyun Lee
(74) *Attorney, Agent, or Firm* — Posternak Blankstein & Lund LLP (57) ABSTRACT

Fabrication processes are provided for a fabric product that provide a continuous moisture and/or thermal barrier around the fabric product, eliminating moisture and thermal leakage through seams and other stitching perforations, and creating an equal barrier quality throughout the structure of the fabric product. A fabric product is also provided.

30 Claims, 6 Drawing Sheets

(51) Int. Cl.
*B32B 7/12* (2006.01)
*B32B 7/14* (2006.01)
*B32B 27/12* (2006.01)
*B32B 27/18* (2006.01)
*B32B 27/32* (2006.01)
*B32B 27/36* (2006.01)
*B32B 27/40* (2006.01)

(56) References Cited

U.S. PATENT DOCUMENTS

| | | |
|---|---|---|
| 2006/0157893 A1 | 7/2006 | Patel |
| 2007/0082165 A1* | 4/2007 | Barrett .................. A41D 27/24 428/57 |
| 2008/0166514 A1 | 7/2008 | Liggett |
| 2009/0280284 A1 | 11/2009 | Pellegrini |
| 2010/0215889 A1 | 8/2010 | Cienski |
| 2012/0282425 A1 | 11/2012 | Gallagher |

* cited by examiner

FABRICATION PROCESS FOR GARMENTS AND OTHER FABRIC PRODUCTS

CROSS-REFERENCE TO RELATED APPLICATIONS

This application claims the benefit under 35 U.S.C. §119 (e) of U.S. Provisional Patent Application No. 61/927,677, filed Jan. 15, 2014, entitled Fabrication of Waterproof Garments By In-Line Lamination Process, the disclosure of which is incorporated by reference herein in its entirety.

BACKGROUND

The availability of waterproof or water resistant fabrics for outerwear presents challenges to create seams that share the water shedding characteristics of the fabrics. Waterproof or water resistant garments are constructed using laminated waterproof fabrics, in which an outer face fabric of water repellant material and a hydrostatic barrier material inside the outer face fabric have been bonded together prior to fabrication of the garment.

The use of such laminated fabrics containing a hydrostatic barrier material poses the problem of how to join the barrier material across a seam without introducing leak pathways. Additionally, the seams provide a weak point in the garment, such that, even if the hydrostatic barrier material is capable of withstanding tens or hundreds of washings without degradation, the seams generally do not withstand more than five or so washings. Thus, the seams are a prime location for the garment to begin to degrade.

An insulating layer may also be present in a garment, and seams form leakage pathways for heat in thermally insulated garments. Perforations from quilt stitching can also provide pathways for heat loss in garments that include quilted components.

SUMMARY OF THE INVENTION

The present invention relates to a fabrication process for a fabric product that provides a continuous moisture and/or thermal barrier around the fabric product, eliminating leakage through seams and other stitching perforations. The process provides a fabric product having an equal barrier quality throughout the structure of the fabric product. Resistance to hydrostatic pressure, heat loss, and penetration by liquids, gases and agents such as blood borne pathogens, viruses and bacteria can be equalized across the entire barrier, including across the barrier seams, of the fabric product.

In one aspect, a process for fabricating a multi-layered fabric product comprises:

(a) providing fabric pattern panels of at least an outer shell fabric, a barrier layer and an adhesive interposed between the outer shell fabric and the barrier layer, the outer shell fabric and the barrier layer provided as separate fabric pattern panels, the barrier layer comprising one of a moisture barrier and an insulation barrier;

(b) aligning each barrier layer fabric pattern panel to a corresponding one or more outer shell fabric pattern panels to form a plurality of composite fabric pattern panels;

(c) fusing each of the composite fabric pattern panels together, leaving an area about a perimeter of each composite fabric pattern panel unfused;

(d) seaming the outer shell fabric pattern panels together along the area left unfused;

(e) folding one or more of the unfused areas of the barrier layer and the adhesive back so that the unfused areas of the barrier layer and the adhesive overlap;

(f) fusing a plurality of the composite fabric pattern panels together to form a complete fabric product having a continuous barrier extending across an inner surface of the outer shell fabric and at least one seam between the outer shell fabric pattern panels.

The invention also provides a multi-layered fabric product comprising an outer shell fabric comprising a plurality of fabric pattern panels, at least one seam formed along edges of fabric pattern panels to join the fabric pattern panels together, the outer shell fabric having an inner side and an outer side; and a barrier layer comprising a plurality of fabric pattern panels fused to the inner side of the outer shell fabric, the fabric pattern panels overlapping in an area extending along the seam of the outer shell fabric, wherein a continuous barrier extends across the inner surface of the outer shell fabric and the at least one seam between the outer shell fabric pattern panels.

In other aspects, the barrier layer comprises a membrane barrier film. The membrane barrier film can comprise a hydrophobic polymer membrane or a hydrostatic barrier membrane. The membrane barrier film can comprise a micro porous structure that allows transport of water vapor across the membrane barrier film while preventing or minimizing transport of liquid water across the membrane barrier film. The membrane barrier film can include activated carbon particles with microporous structures. The membrane barrier film can comprise a microporous polytetrafluoroethylene, a nanoporous polytetrafluoroethylene, an expanded PTFE, a polyurethane, a cross-linked polyurethane, a polypropylene, or a polyester.

In other aspects, the barrier layer can be capable of withstanding a hydrostatic pressure of at least 1, 2, 3, 4, 5, 10, 15, 20, 25, 30, 35, 40, 45, or 50 psi including across the at least one seam. The continuous barrier can be equally resistant to hydrostatic pressure across the inner surface of the outer shell fabric and the at least one seam. The continuous barrier can be equally resistant to at least one of pathogenic microorganisms, blood borne pathogens, viruses, bacteria, liquid chemical agents, and gaseous chemical agents across the inner surface of the outer shell fabric and the at least one seam.

The barrier layer can comprise an insulation material. The insulation material can comprise a natural or synthetic filament material.

The process can further include fusing an inner lining fabric pattern panel with a corresponding one of the plurality of composite fabric pattern panels and folding the inner lining fabric pattern panel back over the seam so that unfused areas overlap. The inner lining fabric can comprise a fleece material or a tricot material. The inner lining fabric can comprise multiple layers quilted together. The inner lining fabric can comprise a polyester, a polyamide, a polyvinylchloride, a polyketone, a polysulfone, a polycarbonate, a fluoropolymer, a polyacrylate, a polyurethanes, a co-polyetherester, a polypropylene, and a co-polyetheramide.

In other aspects, the adhesive can comprise a powder adhesive, a web adhesive, a micro dot adhesive, a nano dot adhesive.

In other aspects, the outer shell fabric can comprises a polyester, a polyamide, a polyvinylchloride, a polyketone, a polysulfone, a polycarbonate, a fluoropolymer, a polyacrylate, a polyurethanes, a co-polyetherester, a polypropylene, and a co-polyetheramide. The outer shell fabric can comprise multiple layers quilted together.

The process can further comprise sewing or ultrasonically welding the outer shell fabric pattern panels together along the area left unfused.

The process can include fusing the composite fabric pattern panels together on a three-dimensional pressing machine. The process of can include fusing the composite fabric pattern panels together on a two-dimensional pressing machine. The process can include fusing each of the composite fabric pattern panels together with a soft set that allows the layers to be adjusted. The process can includes fusing each of the composite fabric pattern panels together with a hard set that does not allow the layers to be adjusted.

The product can comprise an article of clothing, a portion of an article of clothing, a jacket, a coat, a parka, a raincoat, a cloak, a poncho, a shirt, a blouse, pants, shoes, boots, gloves, a hat, a hood, underwear, an undershirt, briefs, a bra, socks, a diaper, a protective suit for handling of hazardous materials, a protective suit for a firefighter, military personnel, or medical personnel, a blanket, a towel, a sheet, pet bedding, a tent, a sleeping bag, a tarp, a boat cover, carpeting, a rug, a mat, a window covering, and upholstery.

In another aspect, a process for fabricating a multi-layered fabric product comprises:

(a) providing fabric pattern panels of at least an outer shell fabric, a barrier layer and an adhesive interposed between the outer shell fabric and the barrier layer, the outer shell fabric and the barrier layer provided as separate fabric pattern panels, the barrier layer comprising one of a moisture barrier and an insulation barrier, the fabric pattern panel of the barrier layer having a configuration corresponding to at least two fabric pattern panels of the outer shell fabric seamed together;

(b) seaming the at least two outer shell fabric pattern panels together along a seam to from a flat outer shell assembly;

(c) aligning the barrier layer fabric pattern panel to the flat outer shell assembly to extend across the seam to form a composite fabric pattern panel;

(d) fusing the composite fabric pattern panel together, leaving an area about a perimeter of the composite fabric pattern panel unfused;

(e) seaming the outer shell assembly to a further outer shell piece;

(f) fusing the fabric product to form a complete fabric product having a continuous barrier extending across an inner surface of the outer shell fabric and at least one seam between the outer shell fabric pattern panels.

In another aspect, a process for fabricating a multi-layered fabric process incorporating a moisture barrier layer, comprises:

(a) providing a membrane barrier film comprising a first membrane film having a first melting temperature laminated to a second membrane film having a second melting temperature lower than the first melting temperature, each of the first membrane film and the second membrane film comprising a micro porous structure that allows transport of water vapor across the film while preventing or minimizing transport of liquid water across the film;

(b) providing fabric pattern panels of at least an outer shell fabric, the membrane barrier film, and in inner lining fabric, the outer shell fabric and the barrier layer provided as separate fabric pattern panels, the barrier layer comprising one of a moisture barrier and an insulation barrier;

(c) aligning each membrane barrier film fabric pattern panel to a correspond one or more outer shell fabric pattern panels to form a plurality of composite fabric pattern panels;

(d) fusing each of the composite fabric pattern panels together at a temperature greater than the second melting temperature and less than the first melting temperature, leaving an area about a perimeter of each composite fabric pattern panel unfused;

(e) seaming the outer shell fabric pattern panels together along the area left unfused;

(f) folding the membrane barrier film and the inner lining fabric back over the seam so that the unfused areas of the membrane barrier film and the inner lining fabric overlap;

(g) fusing all of the composite fabric pattern panels together to form a complete fabric product having a continuous barrier extending across an inner surface of the outer shell fabric and at least one seam between the outer shell fabric pattern panels.

The invention also provides a composite material comprising a first layer comprising a high melt membrane film, a second layer disposed on a first side of the first layer and comprised of a low melt membrane film, the low melt membrane film having a melting temperature lower than a melting temperature of the high melt membrane film. The composite material can further include a third layer disposed on a second side of the first layer and comprising a lower melt film formed from a polyester material, a polyether material, a polypropylene material or a polyurethane material; the lower melt membrane film having a melting temperature lower than the melting temperature of the low melt membrane film. The composite material can in some embodiments provide a membrane barrier film to provide a moisture barrier in a fabric product.

DESCRIPTION OF THE DRAWINGS

The invention will be more fully understood from the following detailed description taken in conjunction with the accompanying drawings in which.

DETAILED DESCRIPTION OF THE INVENTION

A fabrication process is provided that creates a continuous barrier across a multi-layer fabric product that incorporates seams, such as a garment or a garment sub-assembly. The barrier can be a hydrostatic barrier that prevents or minimizes the infiltration of moisture. The barrier can alternatively or additionally be a thermal barrier that minimizes heat loss through the fabric product. While developed primarily for garments, the process can be used for other fabric products that incorporate seams.

The fabrication process employs a fusion process to create a laminated fabric composite in a fabric pattern panel (FPP) configuration in line with the construction of the fabric product. As described more fully below, the FPPs of each fabric layer are positioned and fused together, leaving an area around the perimeter unfused, which allows the barrier layer and any additional inner layers to be folded back to expose an outer shell. The outer shell FPPs are seamed together, for example, by sewing or ultrasonic welding, along the exposed edges to assemble the outer shell of the fabric product. The barrier layer is not compromised during the seaming of the outer shell, because the barrier layer is folded out of the way. Next, the barrier layer and any other layers are folded back over the outer shell such that the unfused edges overlap or interleave. All of the layers of the fabric product are then fused together to complete the lamination process and form the complete fabric product.

In one aspect, the process is used to fabricate a multi-layer fabric product including, as the barrier layer, a membrane barrier film that allows moisture vapor to escape outwardly through micro pores in the membrane barrier film but prevents liquid water from penetrating inwardly. The process provides complete surface coverage of the membrane barrier film across an inner surface including the seams of an outer shell fabric and an inner surface of an inner lining fabric. The seams in the outer shell fabric are thereby completely covered by the membrane barrier film, eliminating the need for seam tape.

The fabric pattern panels are fabricated in a manner that allows seams in an outer shell and an inner lining to be matched or offset, and allows the panel composite structures to be the same or different. The process sets the adhesive film structures in place, creating a uniform laminated membrane barrier film layer. The fusing presses provide a continuous pressure and thermal heat set of the adhesives in an even flow through the fabric pattern panel composites.

The process results in a fused laminate that is superior to current commercial multi-layered membrane barrier film laminated fabrics. The process can eliminate the lead time of purchasing outer shell fabrics pre-laminated with a membrane barrier film. It can eliminate the need to inventory multi-layered laminated membrane barrier film fabrics, as each outer shell fabric, membrane barrier film, adhesive compound and inner lining fabrics can be inventoried individually. It can eliminate the requirement for various fabric protective coatings, such as a separate application of a durable water repellency (DWR) coating on the surface of the shell fabrics after the commercial lamination process.

In one aspect, the process is used to fabricate a multi-layer fabric product including, as the barrier layer, an insulation layer or insulation package that provides a continuous thermal barrier across the fabric product and reduces heat loss through the seams of the outer shell. The process provides complete surface coverage of the insulation package across the inner surface of the outer shell fabric surface and the inner surface of the inner lining fabric. The insulated seams minimize thermal heat loss through the seam surface structures. This process allows the seams of the outer shell panel and the inner liner panel to be matched or offset. The fabric pattern panels are also designed to allow the panel composite structures to be the same or different.

The process allows for greater variation in choices of the outer shell fabrics, membrane barrier films, adhesive, insulation fibers, and inner linings, because the various materials can be individually selected and incorporated directly into the fabrication process at the factory. That is, it is not necessary to pre-order a pre-laminated fabric composite, such as an outer shell and membrane barrier, which requires determining an optimum quantity for the particular fabric product to be fabricated as well as resulting in seams that provide leakage pathways. Also, pre-ordering laminated fabric composites typically entails a wait of several weeks or even months for delivery.

The outer shell fabric(s) and inner lining fabric(s) can be selected for a specific style and color and in the quantity of yardage required for the fabric product being produced. The outer shell fabric can be any fabric, but preferably is mechanically strong, abrasion resistant, and may also be water repellent. The outer shell fabric can be, for example, a soft woven fabric, or any fabric woven or knit from one or more yarns of synthetic or natural material. Similarly, the inner lining fabrics can be, for example, a soft woven fabric, or any fabric woven or knit from one or more yarns of synthetic or natural material. Materials for the outer shell fabric and inner lining fabric can include, for example, polyesters, polyamides, polyvinylchlorides, polyketones, polysulfones, polycarbonates, fluoropolymers, polyacrylates, polyurethanes, co-polyetheresters, polypropylenes, and co-polyetheramides. The outer shell fabric and inner lining fabric can have any desired color and texture (e.g., it can have a camouflage pattern or it can be infrared or near-infrared absorptive or reflective), and can be dyed or impregnated as needed to achieve a desired appearance or functionality, such as water repellency (DWR). The outer shell fabric or inner lining fabric may contain Lycra® or another elastic fiber to create stretch characteristics. Lycra®, also known as spandex or elastane, is a polyurethane polyurea copolymer that can be woven into a fabric, such as an outer shell fabric, a liner fabric, or a seam tape fabric to provide elasticity. Alternatively, elasticity or stretch can be provided by using a woven or non-woven fabric having stretch in at least one direction. It is preferred that the outer shell fabric, lining fabric, and any seam tape fabric provide a similar or essentially identical degree of stretch, for optimum comfort and non-restrictive feel of the garment. A fleece fabric can be any fleece, such as a fleece made of PET, and can have any texture, color, or thickness as desired or as appropriate for a particular garment. The fleece is preferably insulating, breathable, and soft to the touch. Chemical substances such as flammability retarding agents can be also added.

The type and quantity of yardage of the membrane barrier films are selected as required for the fabric product being produced. The membrane barrier films, described in the processes herein can include a "hydrophobic polymer membrane" or "hydrostatic barrier membrane," which typically refers to a layer of synthetic or natural polymers that resists the passage of liquid water, in the form of droplets or microdroplets, across the membrane. Preferably, the hydrophobic polymer membrane allows the passage of water vapor, in the form of individual water molecules, so as to promote breathability of the laminated fabric. A hydrophobic polymer membrane can be prepared from a material such as microporous or nanoporous polytetrafluoroethylene (PTFE), expanded PTFE (ePTFE), polyurethane, cross-linked polyurethane, polypropylene, or polyester. One example of a waterproof laminated fabric is Gore-Tex® fabric (see, e.g., U.S. Pat. No. 3,953,566), which utilizes a porous PTFE membrane as the hydrophobic polymer membrane. The PTFE membrane of a Gore-Tex® fabric has a microstructure characterized by nodes interconnected by fibrils. The microporous or nanoporous nature of the PTFE membrane is such that water droplets are excluded from the pores, whereas water molecules can pass through the pores. Another example of a membrane barrier film is the fabrics available from Cocona Technology, which incorporate activated carbon particles with microporous structures into the films. The membrane barrier films can include patterns printed on one side, for example, by a transfer printing process, which is particularly useful for lighter garments that do not also include a separate lining fabric. The membrane barrier film can also be printed with a coating, for example, to provide protection from abrasion.

The insulation is selected to provide the specific type and weight of a continuous or discontinuous filament insulation or equivalent and in the quantity required for the fabric product being produced. An insulating material can include a natural or synthetic material that provides thermal insulation. Insulating material can be made of synthetic lofted continuous filament insulation such as Climashield® Apex by HarVest Consumer Insulation, or Thinsulate™ microfibers by 3M. Insulating material is preferably lightweight and breathable, and can be made from fibers that can be hydrophobic or hydrophilic, fire retardant, flexible, and obtained from recycling or from a renewable fiber. One or more layers of fabric, such as a fleece or other non-containable fabric, or a tricot, can also be used as an insulating material.

A non-containable fabric refers to a fabric that does not allow saturation of the spaces between fibers of the fabric by an adhesive to create a hydrostatic seal. A non-ontainable fabric generally has a large volume of open space between microfibers of the fabric. Examples of a non-containable fabric include fleece and other insulating materials.

A fleece refers to a pile fabric, including woolen fabrics as well as synthetic fabrics. Fleece be made of or derived from natural fiber such as wool or a synthetic polymer, such as polyethylene terephthalate (PET) (e.g., Polarfleece® by Polartec, LLC). Fleece is typically lightweight, insulating, hydrophobic, and breathable, i.e., allowing water vapor to pass through. Pile fabrics are made by dying loose fibers, which are then mixed and combed into a long rope that is guided into a knitting machine, which permanently locks the fibers into a backing. The fabric is then sheared and finished. A pile results from the individual fibers standing on end. Fleece is made by first twisting fibers into a yarn, which is then knitted into a fabric. The fabric is then brushed, sheared, and finished.

The specific type and weight of the adhesive composite is selected for the type of fabric product being produced. The adhesive can be selected to withstand any laundering processes that the fabric product may undergo, such as washing, drying, dry cleaning, and ironing. The amount of adhesive can be increased or decreased as required by the type of outer shell fabric, membrane barrier film and inner lining fabric combination. The adhesives include powdered adhesives, web adhesives, micro-dot or nano-dot adhesives. Suitable adhesives can include polyurethane adhesives. Adhesives are typically measured in grams per square yard. The process can reduce a negative impact on the moisture vapor transmission rate (MVTR) over the membrane barrier film surface, by reducing the use of adhesives over the area of the membrane barrier film surface. The adhesives can be applied in a discontinuous pattern, such as in a dot, line, or grid pattern, or in no regular pattern, to minimize the amount of adhesive. Suitable adhesives are commercially available from various suppliers such as Bostik.

In another aspect, an individualized design application process is provided to create a garment that is specifically designed for a particular application. For example, a garment can be designed for a particular sport, such as skiing. A garment can be designed to address individual sizing problems, such as longer sleeve requirements. Individually-designed garments may have specific needs, such as a particular zipper placement, or specific performance panels. Specific performance panels can include, for example, a moisture barrier in selected areas of a garment, rather than throughout the entire garment. Similarly, insulation can be added in selected areas of a garment, or insulation of different weights can be located in different areas of the garment.

The process provides for the production of an individual garment with great versatility and little set-up time & lead time, while reducing costs that are associated with current custom manufacturing assembly processes. The outer shell fabrics are accessible in the separate garment make-up step, which allows the outer shell fabric pattern to be altered to accommodate varied panels of laminated & un-laminated fabrics. The variable inner and outer zone area panels can be the same size and shape to allow for invisible barrier seams to be aligned during the fusing process if desired. See US 2012/0282425. Seams can be either straight or curved, and the fabric pieces joined can have any shape or form as required for a particular garment piece. Two or more pieces of fabric can be joined to form a seam.

Figure 1:
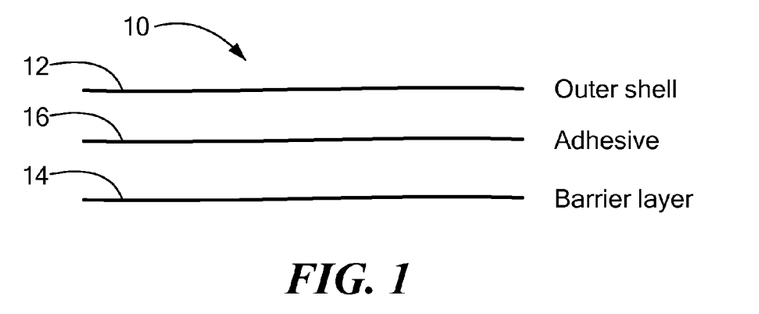
FIG. 1 is a schematic illustration of a multi-layer fabric product of the present invention.

Referring to FIG. 1, a multi-layer fabric product 10 is formed form at least an outer shell fabric 12 and a barrier layer 14. The outer shell fabric can be any suitable fabric, depending on fabric product, as described above. The barrier layer can be a moisture barrier or a thermal barrier, also as described above.

An adhesive layer 16 is interposed between the outer shell fabric and the barrier layer. The adhesive can be pre-applied on the barrier layer on the side adjacent the outer shell fabric. In other embodiments, an adhesive can be pre-applied to the opposite or interior-facing side of the barrier layer, for example, if additional layers are included in the fabric composite, as discussed further below. Exemplary adhesives include a web adhesive, a powder adhesive, a micro-dot adhesive, and a nano-dot adhesive. In one alternative, a web adhesive can be used as the barrier layer.

In an alternative, described further below, the barrier layer can be a multi-layer thermoplastic composite, thereby eliminating the requirement for additional adhesives or decreasing the amount of adhesives that are required.

The fabrication steps for a two-layer fabric product with matching seams are as follows:

1) Roll out the outer shell fabric 12, the barrier layer 14, and the interposed adhesive layer 16 onto a pattern cutting machine. Preferably, a pattern cutting machine that can cut multiple stacked layers of fabric is used, such as a Gerber pattern cutting machine. Cut out the fabric pattern panels (FPPs).

2) Remove the outer shell FPPs 18 and sew or ultrasonically weld any required findings, such as hoods, pockets, zippers, etc., into position. Position a moisture resistant adhesive seam tape where required, for example, along the zippers, using a thermal process.

Figure 2:
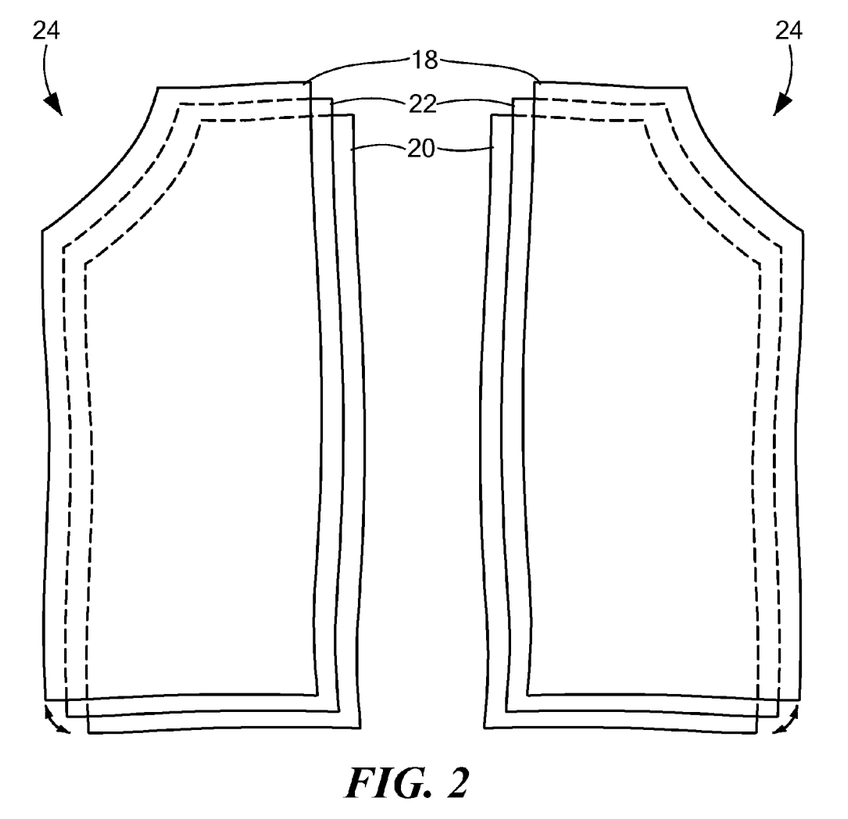
FIG. 2 is a schematic illustration of one embodiment of fabric pattern panels formed in the fabrication process of the present invention.

3) Align each of the partially finished outer shell FPPs 18 to its corresponding barrier layer FPP 20 and adhesive FPP 22, creating the full composite FPPs 24. See FIG. 2. FIG. 2 schematically illustrates two composite FPPs. It will be appreciated that the number of FPPs depends on the particular fabric product. For example, a jacket can have FPPs for front panels, back panels, side panels, and sleeves.

Figure 3:
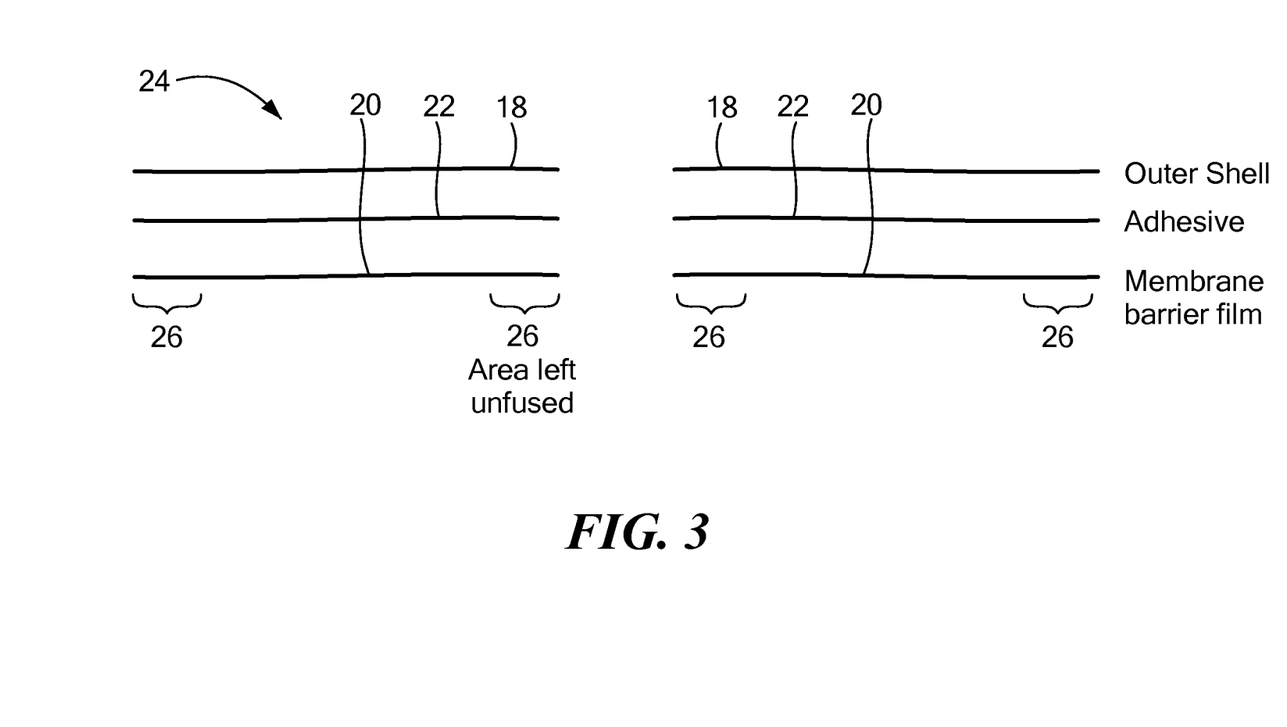
FIG. 3 is a schematic illustration of the fabric pattern panels of FIG. 2 at a further step in the fabrication process.

4) Fuse each of the full composite FPPs 24 together to create the fabric panel pattern alignment using either a soft set or a hard set. A soft set allows the barrier layer to be peeled back without damaging the surface structures. A hard set permanently sets the layers in place. An area 26 around the perimeter of the panel is left unfused, which allows the barrier layer FPP 20 and adhesive layer FPP 22 to be folded back without damaging the surface structures. The width of the area left unfused can be at least ½" in width or greater. In some embodiments, the width of the unfused area can be at least ⅝", ¾", 1 inch, 2, inches, 3 inches, or greater. See FIG. 3.

When fusing fabric layers with a soft set fuse, the press is set to a temperature of approximately 225° F. at zero pressure to allow the adhesive to flow to create an initial bond between the surfaces. This initial bond allows the individual layers to be pulled away from the other layers. When fusing fabric layers with a hard set fuse, the press is set to a temperature between 235° F. to 275° F. at 40 psi to 50 psi for 20 to 40 seconds. After pressing, the composite fabric is cooled under vacuum to set the adhesives into place and permanently laminate the fabric panels together.

Figure 4:
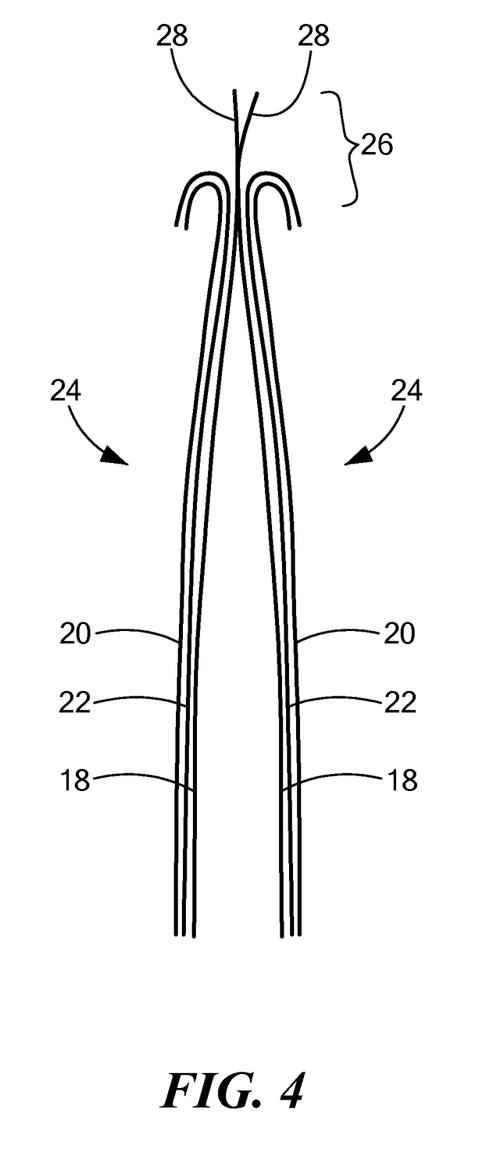
FIG. 4 is a schematic illustration of the fabric pattern panels of FIG. 3 at a further step in the fabrication process.

5) Fold back the barrier layer FPP 20 and the adhesive layer FPP 22 to expose the surface of the outer shell fabric 18. See FIG. 4.

6) Seam the outer shell fabric pattern panels together to provide a seam 28 along the exposed edges, for example, by sewing or ultrasonically welding, to assemble the outer shell of the fabric product. See FIG. 4. The barrier layer is not compromised, as it is held in position adjacent the outer shell by the adhesives and the edges of the barrier layer are folded over onto itself, out of the way of the seaming.

7) Fold the barrier layer and the adhesive layer (if present) back over the outer shell seam taped garment, so that the unfused areas 26 overlap. See FIG. 5.

Figure 5:
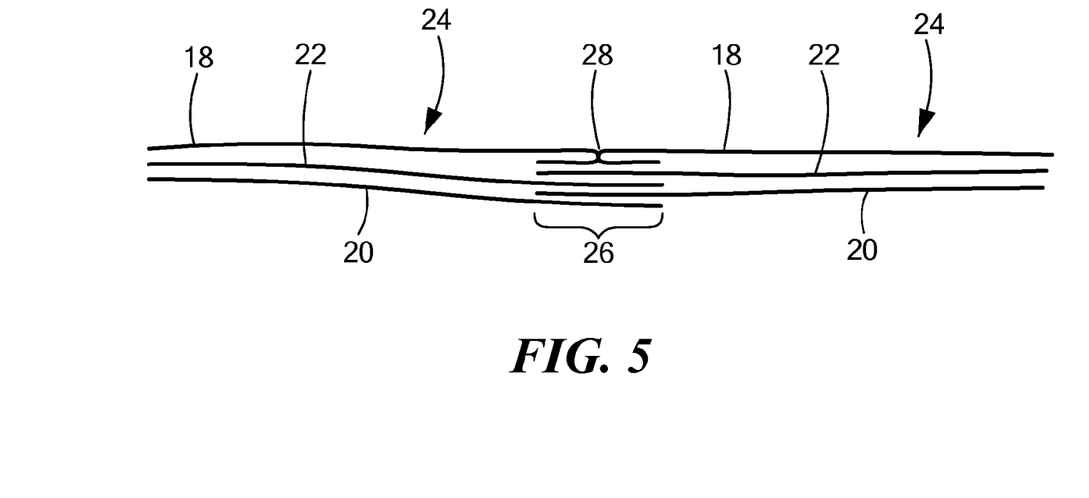
FIG. 5 is a schematic illustration of the fabric pattern panels of FIG. 4 at a further step in the fabrication process.

8) Fuse the assembled layers together, including the unfused areas 26, to complete the lamination process and form the complete fabric product. This creates a uniform barrier layer throughout the complete fabric product. Moisture and thermal leakage pathways are eliminated and strengthened seams are provided in the finished fabric product.

The fusion process can employ a three-dimensional form finisher, such as a VEIT 8363 Basic Multiform finisher. A three-dimensional form finisher employs a dummy form over which a fabric product such as a garment is disposed. Heat and steam are introduced through the interior, applying pressure that inflates the garment outwardly and fuses all the layers together. Another example is the Dressman ironing robot from Siemens. To use such a finisher or robot, the garment is placed over the robot, which is then inflated to fit the garment from the inside, applying pressure. The robot is then filled with heated air or steam, which applies heat to the entire garment. Alternatively, a conventional steam ironing table could be used to carry out alignment lamination.

Figure 6:
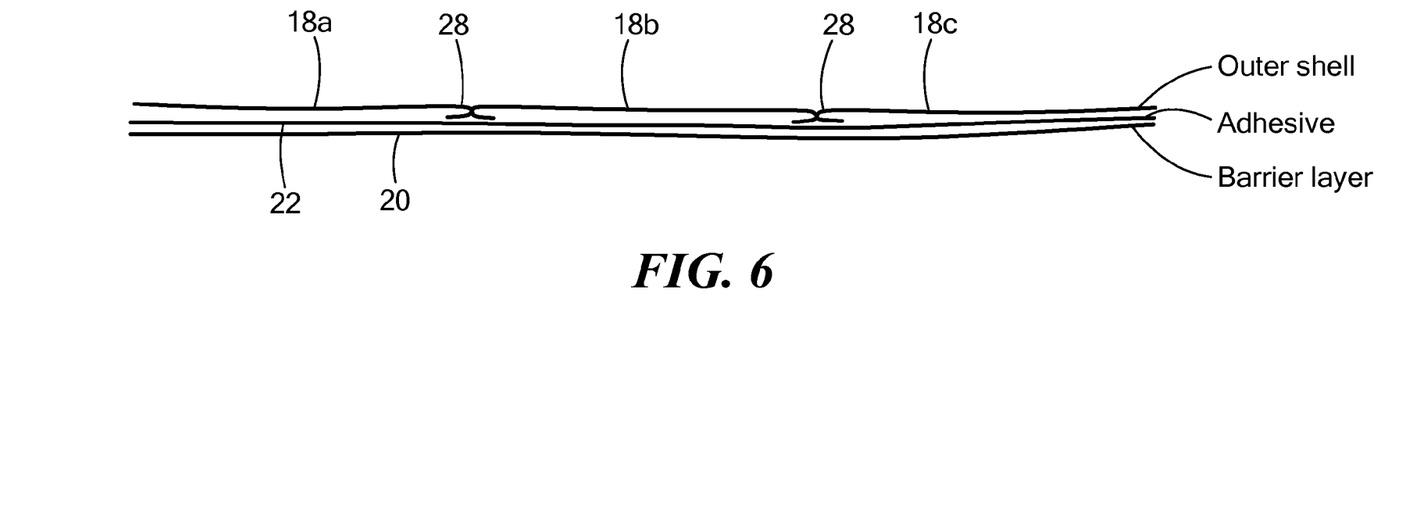
FIG. 6 is a schematic illustration of a further embodiment of a multi-layer fabric product.

In another aspect, the seams in the outer shell do not need to align with seams in the barrier layer. See FIG. 6. For example, sides 18A, 18C and back 18B of the outer shell of a garment such as a jacket can be cut out as separate FPPs and seamed together to create a single large panel that can lay flat. The barrier layer FPP 20 and adhesive layer FPP 22 can be cut out as a single large panel that matches the perimeter of the seamed single large panel of the outer shell. In this case, the outer shell fabric is rolled out and cut separately from the barrier layer and adhesive layer. Then the barrier layer and adhesive layer are positioned on the inner surface of the outer shell FPP and fused, leaving the edges around the perimeter unfused, as described above. Because this assembly can lay flat, a two-dimensional pressing machine, such as VEIT BRI-2001 E/101 pressing machine, can be used. The barrier layer fully covers the seams 28 in the outer shell, leading to a continuous, uniform barrier across the outer shell.

Figure 7:
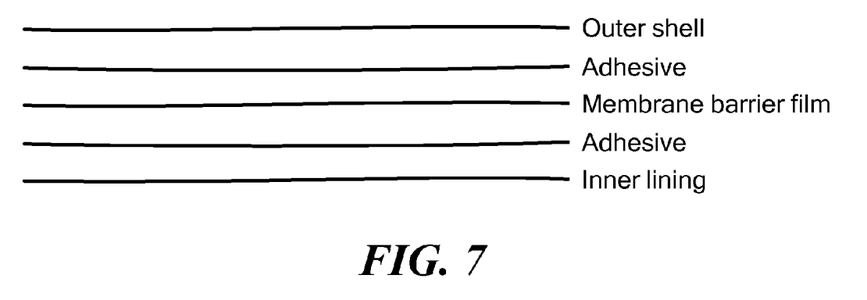
FIG. 7 is a schematic illustration of a further multi-layer fabric product.
Figure 8:
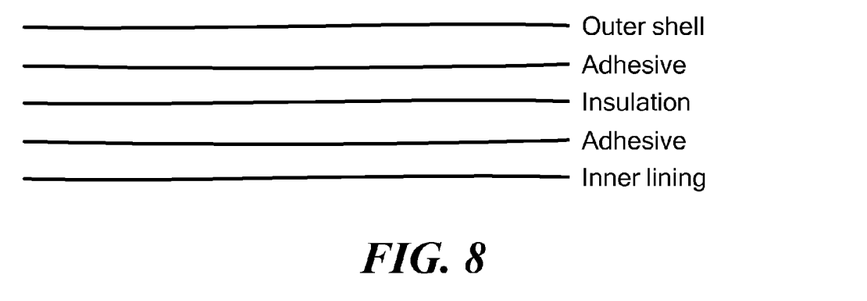
FIG. 8 is a schematic illustration of a still further multi-layer fabric product.
Figure 9:
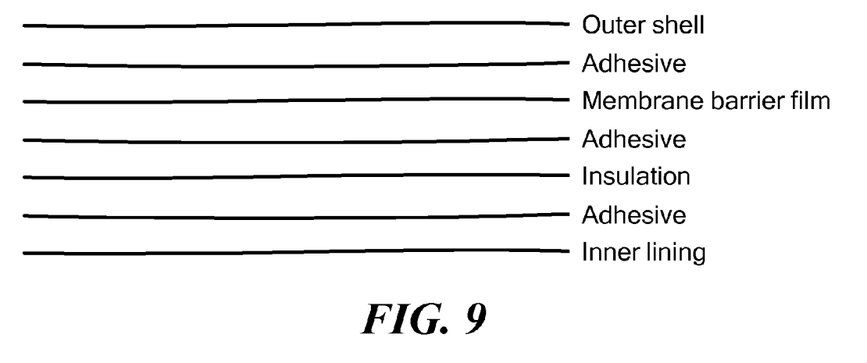
FIG. 9 is a schematic illustration of a still further multi-layer fabric product.

Many fabric products incorporate three or more layers. For example, in one embodiment, a multi-layer fabric composite is formed from multiple layers including an outer shell fabric, an inner lining fabric, and as the barrier layer, a membrane barrier film as a moisture barrier between the outer shell fabric and the inner lining fabric. See FIG. 7. The inner lining fabric can be an insulating fabric, such as a fleece, or an un-insulating fabric, such as a tricot. Alternatively, the barrier layer can be an insulation package of a continuous or discontinuous filament insulation or equivalent. See FIG. 8. In a further alternative, in addition to a membrane barrier film, an insulation package can be provided adjacent an interior side of the inner lining fabric. See FIG. 9. A suitable adhesive layer can be interposed between each of the layers as needed.

The fabrication steps for a three-layer or four-layer fabric composite with matching seams and employing as the barrier layer a membrane film and, optionally, an insulation package in addition to the membrane film, are as follows:

1) Roll out the outer shell fabric, membrane film, and any adhesive layers, the insulation package (if present), and the inner lining fabric onto a pattern cutting machine, such as a Gerber pattern cutting machine or equivalent, and cut out the garment fabric pattern panels (FPPs).

2A) Remove the outer shell FPPs and sew or ultrasonically weld any required findings, such as hoods, pockets, zippers, etc., into position, and position an adhesive seam tape film where required through a thermal process.

2B) Remove the inner lining FPPs and sew or ultrasonically weld any required findings, such as zippers, pockets, etc. into position.

3) Align the partially finished outer shell and partially finished inner shell FPPs to the matching membrane film FPP, and the insulation package (if present), creating the full composite FPPs. Position the adhesive layer(s) on the appropriate side of the membrane barrier film (if not already laminated to the membrane barrier film).

4) Fuse the full composite FPPs together to create the fabric panel pattern alignment using either a soft set or a hard set leaving an area around the perimeter of the panel unfused, as described above.

5) Fold back the membrane film, the adhesive layer or layers, the insulation package (if present), and the inner lining fabric at the unfused areas to expose the outer shell fabric surface.

6) Seam the outer shell fabric pattern panels together along the exposed edges, for example, by sewing or ultrasonically welding, to assemble the outer shell of the fabric product. The membrane barrier film (and insulation package if present) is not compromised, as it is held in position adjacent the outer shell by the adhesives and the edges of the membrane barrier film are folded over onto itself, out of the way of the seaming. It is not necessary to attach an adhesive seam tape to the seam at this step (although it could be done if desired; see US 2012/0282425).

Figure 10:
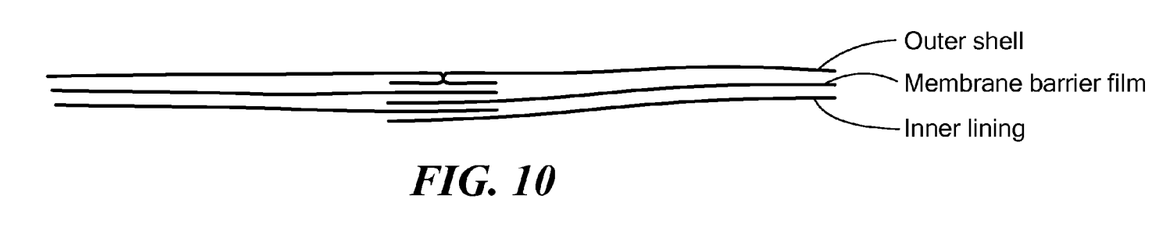
FIG. 10 is a schematic cross-sectional illustration of a multi-layer fabric product.
Figure 11:
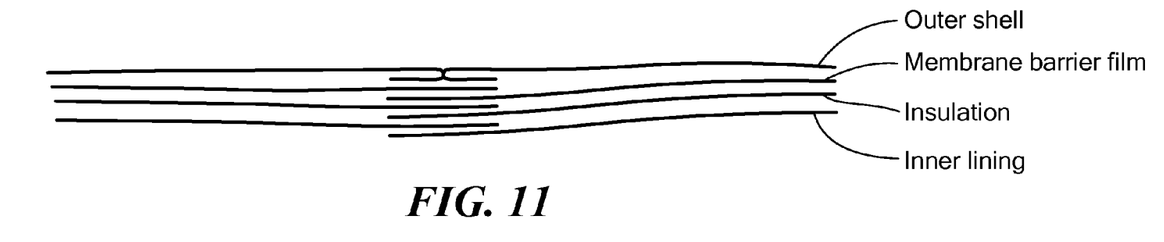
FIG. 11 is a schematic cross-sectional illustration of a further multi-layer fabric product.

7) Fold the membrane barrier film, the adhesive layer(s), the insulation package (if present), and the inner lining fabric back over the outer shell seam taped garment, so that the seam allowances overlap. See FIG. 10 or 11 (in which the adhesive layers have been omitted for clarity).

8) Seam the inner lining FPP composite together along the seam surface, for example, by sewing or ultrasonic welding. The unfused area of the inner lining FPP can be pulled away from the other layers as needed to form the seam.

9) Fuse the assembled garment, product or sub assembly product to complete the lamination process, as described above. The lamination process can be accomplished by applying a heat and/or pressure source over a large area of the assembled garment, or over the entire garment at once. This final step of alignment lamination creates a strong laminate bond between the fabrics of the garment.

This creates a uniform membrane barrier film layer throughout the complete garment assembly, eliminating leakage pathways through the moisture barrier and providing strengthened seams in the garment, product, or sub-assembly product.

It will be appreciated that a three-layer fabric product incorporating only an insulation layer can be fabricated as described above for a three-layer product incorporating only a membrane barrier film. Similarly, additional layers can be included and can be handled in the same manner as the barrier layer or insulation package described above.

In a variant of the fabrication process for a multi-layer fabric composite with matching seams, the steps are as follows, in which steps 1-4 are as described above:

5) Fold back the composites of the inner lining fabric and adjacent layer(s) of adhesive to expose the outer shell fabric, the membrane film, and the interposed adhesive layer (if present).

6) Seam the outer shell fabric, the adhesive layer (if present) and the membrane barrier film together to create the outer shell garment. While the membrane film surface is exposed, position an adhesive seam tape film where required through a thermal process.

7) Fold the inner lining fabric back over the outer shell garment.

8) Seam the inner liner fabric panel together along the seam surface, for example, by sewing or ultrasonic welding.

9) Fuse the assembled garment, product or sub assembly product to complete the lamination process, as described above.

For a fabric product in which the seams between the outer shell fabric and one or more of the other layers are offset, rather than matched, the following steps are followed:

1A) Roll out the outer shell fabric onto a pattern cutting machine, such as a Gerber pattern cutting machine or equivalent, and cut out the offset outer shell fabric composite of the garment fabric pattern panel.

1B) Roll out the adhesive layer (if present), the membrane film, further adhesive layer (if present), the insulation package (if present), and the inner lining fabric composites onto a pattern cutting machine, such as a Gerber pattern cutting machine or equivalent, and cut out the offset composites of the garment fabric pattern panels.

2A) Remove the outer shell fabric pattern panels and sew or ultrasonically weld the required findings, i.e. hoods, pockets, zippers, etc. into position.

2B) Remove the inner lining fabric pattern panels and sew or ultrasonically weld the required findings, i.e. zippers, pockets, etc. into position.

3) Align the partially finished outer shell and partially finished inner shell fabric pattern panels, the membrane film, the adhesive layer(s), and the insulating package (if present), creating the full offset fabric pattern panel composites.

4) Fuse the full composite fabric pattern panels together to create the fabric panel pattern alignment using either a soft set or a hard set, leaving an area around the perimeter unfused, as described above.

5) Fold back the membrane film, the adhesive layer(s), the insulation package (if present), and the inner lining fabric at the unfused areas to expose the outer shell fabric surface.

6) Seam the outer shell fabric pattern panels together, for example, by sewing or ultrasonic welding, to assemble the outer shell garment, product, or sub-assembly product.

7) Fold membrane film, the adhesive layer(s), the insulation package (if present), and the inner lining fabric back over the outer shell garment.

8) Seam the inner liner fabric panel composite together along the seam surface, for example, by sewing or ultrasonic welding.

9) Fuse the assembled garment, product or sub assembly product to complete the lamination process, as described above.

In a variant of the fabrication process for a multi-layer fabric composite with offset seams, the steps are as follows, in which steps 1-4 are as described above:

5) Fold back the composites of the inner lining fabric and adjacent layer of adhesive (if present) to expose the outer shell fabric, the membrane film, and the interposed adhesive layer (if present).

6) Sew or ultrasonically weld the outer shell fabric, the adhesive layer (if present), and the membrane film together to create the outer shell garment. While the membrane film surface is exposed, position an adhesive seam tape through a thermal process.

7) Fold over the inner lining fabric and the adjacent adhesive layer (if present) back over the outer shell garment, product, or sub-assembly product.

8) Seam the inner liner fabric pattern panel together along the seam surface, for example, by sewing or ultrasonic welding.

9) Fuse the assembled garment, product or sub assembly product to complete the lamination process, as described above.

Some garments include one or two quilted insulation packages. For example, a quilted insulation package can be the outside of the garment, the inside of the garment, or on both the outside and inside of the garment. The quilting can provide a desirable aesthetic appearance in addition to incorporating thermal insulation into the garment. However, the stitching used to quilt the layers of the insulation package also causes small perforations through which heat loss occurs. Thus, an additional continuous thermal barrier can be provided to reduce this heat loss through the quilted stitches.

Figure 12:
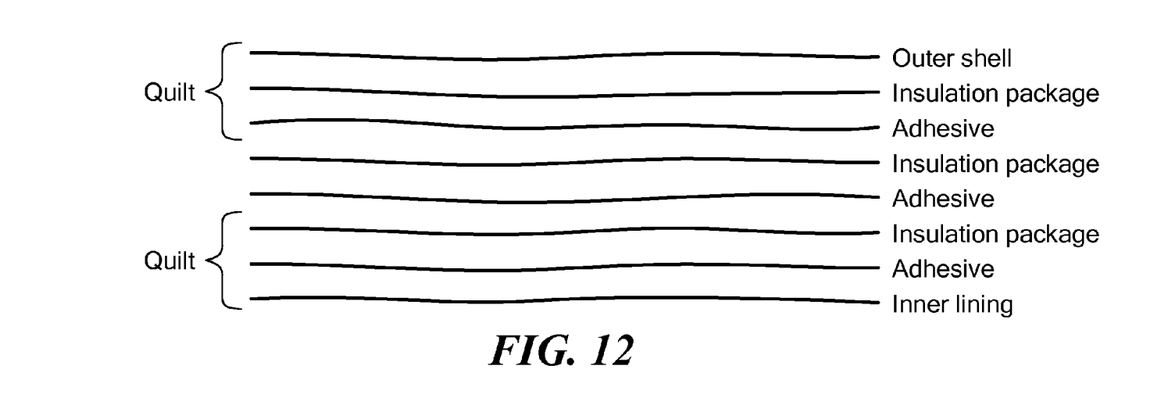
FIG. 12 is a schematic illustration of a still further multi-layer fabric product.

Referring to FIG. 12, one example of a quilted garment is fabricated from layers including an outer shell fabric, an outer shell insulation package, an lining inner insulation package, an inner lining fabric, and an intermediate barrier layer insulation package. The insulation packages can be formed from a continuous or discontinuous filament insulation or equivalent. Separate adhesive layers can be interposed between the outer insulation package and the intermediate insulation package and between the inner insulation package and the intermediate insulation package. The adhesive layers can be a micro-dot adhesive, a powder adhesive or a web adhesive. The adhesive layers can be pre-applied to the insulation packages.

The fabrication steps for a quilted fabric product are as follows:

1A) Quilt together the outer shell fabric, outer shell insulation package, and adhesive layer (if present) in a desired quilting pattern or motif to create an outer quilted composite. Similarly, quilt together the inner lining fabric, the inner lining insulation package, and adhesive layer (if present) in a desired quilting pattern or motif to create an inner quilted composite. If necessary, fuse an adhesive layer to one or both sides of the intermediate barrier layer insulation package.

1B) Roll out the outer quilted composite, the barrier layer insulation package, and the inner quilted composite above onto a pattern cutting machine, and cut out the fabric pattern panels.

2A) Remove the outer quilted fabric pattern panel composites and sew or ultrasonically weld the required findings, i.e. hoods, pockets, zippers, etc. to complete the assembly.

2B) Remove the inner quilted fabric pattern panel composites and sew or ultrasonically weld the required findings, i.e. zippers, pockets, etc. into position.

3) Align each of the partially finished outer quilted composites and the inner quilted fabric composites to the corresponding barrier layer insulation packages, creating the full FPP composites.

4) Fuse the full FPP composites together to create the fabric panel pattern alignment using either a soft set or a hard set, as described above.

5) Fold back the barrier layer insulation packages and the inner quilted composites to expose the interior side of the outer quilted composite.

6) Sew or ultrasonically weld the outer quilted composite FPPs together to assemble the outer shell of the fabric product.

7) Fold the barrier layer insulation package and the inner quilted composites back over of the outer quilted composite the seam allowances overlap.

8) Sew or ultrasonically weld the inner quilted composites together along the seam surface.

9) Fuse the assembled layers together to complete the lamination process. This creates a uniform insulation layer of a continuous or discontinuous filament insulation or equivalent throughout the complete fabric product, eliminating thermal heat loss through the outer shell seams and quilting stitches and a thermal heat gain next to the body.

Garment Assembly Example 1

As an example, the above fabrication steps can be used in the fabrication of a garment such as a waterproof/breathable (WP/BR) jacket having an outer shell, a membrane film barrier layer, and inner lining, as follows:

1) Roll out the outer shell fabric, the adhesive layer (if the adhesive has not been pre-applied), the membrane film, the adhesive (if the adhesive has not been pre-applied), and the inner lining fabric composite onto a pattern cutting machine and cut out the garment fabric pattern panels. Optionally, the inner lining fabric pattern does not have to be matched to the outer shell fabric pattern.

2) Remove the outer shell fabric, the adhesive, the membrane film, and the adhesive pattern panels and sew or ultrasonically weld and seam tape the back, sides and front panels of the garment assembly; add any required findings, i.e. zippers, pockets, etc. into position to pre-finish the outer shell garment assembly.

3) Take the inner lining fabric pattern panels and sew or ultrasonically weld the garment assembly as necessary.

4) Optionally sew in and seam tape a zipper and a collar assembly.

5) Position the inner lining fabric pattern panel garment assembly on top of the fabric pattern panel two-layer laminate garment assembly to form a fabric pattern panel garment pattern assembly.

6) Fuse the fabric pattern panel garment pattern assembly together with a hard set, leaving an unfused area around the perimeter to allow the insertion of the zipper, collar, sleeve areas and the hem line.

7) For each sleeve, lay out the sleeve fabric pattern panels, which are the outer shell laminate and inner lining.

8) Position the inner lining fabric pattern panel sleeve on top of the outer shell laminate fabric pattern panel sleeve and membrane barrier film to form a fabric pattern panel sleeve pattern assembly.

9) Hard set flat press leaving an unfused area around the perimeter to allow the insertion and finishing of the sleeve assemblies.

10) Sew and seam tape the FPP sleeve assemblies to the FPP garment pattern assembly.

11) Sew and seam tape the zipper and collar assembly (if not performed in the garment assembly step above).

12) Ultrasonically weld or sew the open flaps of the inner lining fabric seams to complete the sleeve and shoulder seam surfaces.

13) Hard set press the non-pressed open flap seam surfaces to complete the pressing of the FPP garment pattern assembly.

Garment Assembly Example 2

As another example, the above fabrication steps can be used in the fabrication of a garment such as an insulated, WP/BR jacket having an outer shell, a membrane film barrier layer, an insulation package, and an inner lining, as follows:

1) Roll out the outer shell fabric, the web adhesive (if the adhesive is not pre-applied), the membrane film, the adhesive (if the adhesive is not pre-applied), and the inner lining fabric composite onto a pattern cutting machine, and cut out the garment fabric pattern panels. Optionally, the inner lining fabric pattern panel does not have to be matched to the outer shell fabric pattern panel.

2) Roll out the insulation package and the optional adhesive and cut out in a single piece construction matching the sewn inner lining fabric pattern panel assembly.

3) Remove the outer shell, web adhesive (if present), membrane film, and web adhesive (if present) fabric pattern panels and sew or ultrasonically weld and seam tape the back, sides and front panels of the garment assembly. Add any desired findings, i.e. zippers, pockets, hood, etc., into position to pre-finish the outer shell garment assembly.

4) Take the inner lining fabric pattern panel and sew or ultrasonically weld the inner lining garment assembly. Optionally sew in and seam tape the zipper and the collar assembly.

5) Position the inner lining fabric pattern panel garment composite assembly on top of the prefabricated outer shell fabric pattern panel assembly, the FPP garment pattern assembly.

6) Hard set flat press the FPP garment pattern assembly leaving an unfused area around the perimeter to allow the insertion of the zipper, collar and sleeve areas.

7) For each sleeve, lay out the sleeve fabric pattern panels, which are the outer shell laminate, insulation, and inner lining.

8) Position the insulation and the inner lining sleeve fabric pattern panels on top of the outer shell laminate fabric pattern panel sleeve, forming an FPP sleeve pattern assembly.

9) Hard set flat press leaving an unfused area around the perimeter to allow the insertion and finishing of the sleeve assemblies.

10) Sew and seam tape the FPP sleeve pattern assemblies to the FPP garment pattern assembly.

11) Sew and seam tape the zipper and collar assembly (if not performed in the garment assembly procedure above).

12) Fold over and position the insulation layer over the seam taped seam surface.

13) Ultrasonically weld or sew the open flaps of the inner lining fabric seams to complete the sleeve and shoulder seam surfaces.

14) Hard set press the non-pressed open flap seam surfaces to complete the pressing of the FPP garment pattern assembly.

Garment Assembly Example 3

The process as above in Example 2 can be used with a multi-layer composite formed of individual parts, where seam tape would not be required in the sleeve and the shoulder seams:

Steps 1 through 6 are the same as above in Example 2.

7) For each sleeve, lay out and cut out the outer shell fabric, web adhesive, membrane film, web adhesive, optional insulation, optional web adhesive, and inner lining fabric pattern panels.

8) Position the inner lining fabric pattern panel sleeve assemblies, the optional web adhesives, the optional insulation on top of the outer shell laminate fabric pattern panel sleeve assembly to form each FPP sleeve assembly.

9) Hard set flat press leaving an unfused area around the perimeter to allow the insertion and finishing of the sleeve assemblies.

10) Sew the outer shell fabric pattern panel sleeve to the FPP garment pattern assembly.

11) Sew and seam tape the zipper and collar assembly (if not performed in the garment assembly procedure above).

12) Fold over and position the web adhesive, membrane film, web adhesive, insulation fiber layer, web adhesive over the sewn outer shell fabric seam surface.

13) Ultrasonically weld or sew the open flaps of the inner lining fabric seams to complete the sleeve and shoulder seam surfaces.

14) Hard set press the non-pressed open flap seam surfaces to complete the pressing of the FPP garment pattern assembly.

A variety of fabric products can be fabricated by the process of the present invention. Such fabric products include garments or articles of clothing, such as jackets, coats, parkas, raincoats, cloaks, ponchos, shirts, blouses, pants, shoes, boots, gloves, hats, hoods, or other headwear, or underwear such as undershirts, briefs, bras, socks, and diapers. Fabric products can also include protective suits for handling of hazardous materials, including chemicals, biological materials, and radioactive materials, or in protective suits for firefighters, military personnel, and medical personnel. Other fabric products include blankets, towels, sheets, pet bedding, tents, sleeping bags, tarps, boat covers, carpeting, rugs, mats, window coverings, and upholstery, and any fabric-based structure or device that serves to entrap, store, or transport water or an aqueous liquid, such as bags, hoses, or bladders, or where thermal insulation is needed.

Machines for performing cut/weld seaming operations using ultrasound are known and commercially available. For example, the firm Jentschmann, AG (Huntwangen, Switzerland) provides a variety of suitable machines. The ultrasound energy applied during seaming can be adjusted according to the needs of the particular seam, including the characteristics of the fabrics and the adhesive. Welding conditions depend on conditions of temperature and humidity and the type of fabric, hydrostatic barrier membrane, and fleece. Ultrasonic machines are available which simply weld fabrics together as well as those which cut fabrics in addition to welding them. Adjusting an ultrasonic fabric welding machine according to such conditions is well within the capabilities of the ordinary skilled person. It is understood that an ultrasonic welding or cutting and welding machine can be used to carry out methods of the invention in different modes. In addition to ultrasound, other sources of energy that can be used to perform a seam welding operation include heat energy, laser energy, and other forms of electromagnetic radiation (e.g., microwave or radio frequency).

Several known methods are available for testing the hydrostatic resistance properties of a fabric product fabricated according to the present invention. These include ASTM Standard D 5385, 1993(2014)E1, "Standard Test Method for Hydrostatic Pressure Resistance of Waterproofing Membranes," ASTM International, West Conshohocken, Pa., DOI: 10.1520/D5385_D5385M-93R14E01. In one example, a fabric product according to the invention has a hydrostatic resistance of at least 1, 2, 3, 4, or 5 psi for 3 minutes using ASTM D 5385. In another example, a fabric product according to the invention has a hydrostatic resistance of at least 3 psi for 3 minutes using ASTM D 5385. In some embodiments, a fabric product according to the invention has a hydrostatic resistance of at least 1, 2, 3, 4, 5, 10, 15, 20, 25, 30, 35, 40, 45, or 50 psi.

Hydrostatic resistance can also be tested in accordance the Hydrostatic Resistance test method described in ASTM D751, 2006(2011) "Standard Test Methods for Coated Fabrics," ASTM International, West Conshohocken, Pa., DOI: 10.1520/D0751-06R11. In some embodiments, a fabric product according to the invention has a hydrostatic resistance of at least 1, 2, 3, 4, 5, 10, 15, 20, 25, 30, 35, 40, 45, or 50 psi.

The fabric product can also be tested by a test method to evaluate the barrier effectiveness against liquids. Such test methods include ASTM F903, 2010, "Standard Test Method for Resistance of Materials Us in Protective Clothing to Penetration by Liquids," ASTM International, West Conshohocken, Pa., DOI: 10.1520/F0903-10. The fabric product can be tested as a barrier against various compounds, such as foams (for example, aqueous fire fighting foams), hydraulic fluids, battery acid (which includes sulfuric acid, for example, 37%), pool chlorine, and fuels (for example, Fuel C).

As another example, the fabric product can be tested to see if it passes a test for resistance to synthetic blood as determined by ASTM F1670, 2008(2014)E1, "Standard Test Method for Resistance of Materials Used in Protective Clothing to Penetration by Synthetic Blood," ASTM International, West Conshohocken, Pa., DOI: 10.1520/F1670_F1670M-08R14E01. A further test is to determine if the fabric product passes a test for resistance to pathogenic micro-organisms, including blood borne pathogens as determined by ASTM F1671, 2013, "Standard Test Method for Resistance of Materials Used in Protective Clothing to Penetration by Blood-Borne Pathogens Using Phi-X174 Bacteriophage Penetration as a Test System," ASTM International, West Conshohocken, Pa., DOI: 10.1520/F1671_F1671M.

A variety of adhesives are commercially available and can be used as the adhesive layer(s) described above. As noted above, an adhesive, such as a web adhesive, a powder adhesive, or a micro-dot adhesive, can be pre-applied on one or both sides of the membrane barrier film or the insulation package. In one alternative, a web adhesive can become the membrane barrier film. Generally, the least amount of adhesive necessary should be used to avoid blocking the micro pores of the barrier membrane film and reduce the moisture vapor transport rate (MVTR). A powder adhesive is best suited to have the least impact on the MVTR of the membrane barrier film. Micro dot adhesives typically decrease the MVTR of the membrane barrier film the greatest amount.

In one trial, the MVTR of a laminate employing a stretch fabric, a membrane barrier film, and a fleece lining, employing several adhesives from Bostik was measured and compared to the MVTR of the membrane barrier film alone. The following results were obtained:

| Sample | Adhesive | MVTR (g/m$^2$/24 hours) | Percent reduction in MVTR |
|---|---|---|---|
| A | Bostik powder | 536 | 20% |
| B | PE103 15G web adhesive | 498 | 26% |
| C | PE103 25G web adhesive | 482 | 28% |

In a further alternative, the membrane barrier film can be a multi-layer thermoplastic composite, thereby eliminating the requirement for additional adhesives or decreasing the amount of adhesives that are required.

In another aspect of the present invention, a low melt membrane film can be provided on one or both sides of a high melt membrane film, for use as a moisture barrier in a garment, to enhance the subsequent adhesion of the membrane barrier film to another layer by a chemical and thermal mechanical bond. The low melt film melts at lower temperatures, providing adhesion at reduced temperatures. This can be useful, for example, for temporary adhesion during a garment fabrication process or for tacking one substrate to another prior to forming a more permanent attachment between the substrates. Also, the presence of the low melt membrane film allows for a reduction in the amount of additional adhesives, such as micro-dot, powdered, or web adhesives, that would otherwise be needed, which can reduce the cost of the membrane film. For example, the melting temperature of the high melt membrane film can be, for example, 5, 10, 15, 20, 30, 40, or 50° C. or more higher than the melting temperature of the low melt membrane film.

In some garments that employ a moisture barrier layer, the barrier layer is provided by a breathable thermoplastic polyurethane (TPU) membrane film as the primary barrier layer. Usually, the TPU membrane film has a high melt temperature rating. A low melt TPU membrane film can be added on one or both sides of the high melt TPU membrane film as one or more outer layers to enhance the chemical and thermal mechanical bond surfaces. For example, a low melt TPU membrane film can subsequently react as an adhesive in other portions of the garment fabrication process, such as when an invisible barrier seam is formed, as described US 2012/0282425. The low melt TPU membrane film can react with the adhesive used in these subsequent fabrication steps, creating a higher quality adhesion bond. Because of the adhesion qualities of the low melt TPU membrane films, operator error can be reduced, and the upper and lower heat and pressure bounds during the pressing sequences of the fabrication process can be expanded.

Additionally, it will be appreciated that TPU membrane films can have different melt temperatures. Thus, a TPU membrane film having a first low melt temperature can be provided on one side of a substrate, and a further TPU membrane film having a different, lower, melt temperature can be provided on the opposite side of the substrate. For example, the two low melt films can have different degrees of cross-linking.

The low melt membrane film can be formed from a variety of suitable materials, such as a polyester, polyether, polypropylene or a polyurethane material. The film can be breathable or non-breathable.

The high melt membrane film can also be formed from a variety of suitable materials, such as a polyester, polyether, polypropylene, polyurethane, expanded polytetrafluoroethylene (ePTFE) or a polytetrafluoroethylene material. The high melt film can be breathable or non-breathable. The high melt membrane film can be a single pass, single ply high melt membrane film as described in Example 3.

In a fabrication process, the low melt membrane film(s) and high melt membrane film can be fed from spools onto a conveyor belt and introduced into a suitable heated lamination machine. Alternatively, one or more of the films can be provided from suitable extrusion dies. Additionally, during the fabrication process, chemical additives can be compounded with one or more of the membrane films in a liquid or plastic form (for example, through an extrusion die) or applied from hoppers, nozzles, or other dispensers onto the films in substrate form. In a further alternative, the low melt membrane film can be die cut into smaller pieces or an open pattern to reduce the surface area of the high melt membrane film that is covered by the low melt membrane film.

In one example, a multi-layer TPU/ePTFE membrane layout includes a high melt ePTFE breathable barrier membrane film, and a low melt TPU breathable membrane film on one or both surfaces. The TPU films on the outer surfaces can be selected to have different melt temperatures, i.e., a low melt TPU and a lower melt TPU.

The composite membrane film as described herein can be used as a moisture barrier in fabric products such as garments. Various woven, non-woven, or knit outer shell fabrics can be selected and fused to the membrane barrier film outer surface. Similarly, various woven or knit inner lining fabrics can be selected and fused to the membrane barrier film inner surface. The composite membrane film can be fed directly to the fabric, or the composite membrane film can be stored, for example, rolled on a spool, for subsequent use. Completion of the lamination process occurs during the remainder of the garment manufacturing process.

In some cases, one of the films can be a single ply membrane film after a single pass through an extruder that may not be commercially viable due to the presence of pin holes. Laminating the single pass film to the other layers effectively fills the pinholes. By providing more usable material, waste is eliminated and cost reductions can be realized in fabrication processes for various fabric products that employ membrane films.

It will be appreciated that the various features of the embodiments described herein can be combined in a variety of ways. For example, a feature described in conjunction with one embodiment may be included in another embodiment even if not explicitly described in conjunction with that embodiment.

The present invention has been described with reference to the preferred embodiments. It is to be understood that the invention is not limited to the exact details of construction, operation, exact materials or embodiments shown and described, as obvious modifications and equivalents will be apparent to one skilled in the art. It is believed that many modifications and alterations to the embodiments disclosed will readily suggest themselves to those skilled in the art upon reading and understanding the detailed description of the invention. It is intended to include all such modifications and alterations insofar as they come within the scope of the present invention.

What is claimed is:

1. A process for fabricating a multi-layered fabric product comprising:
(a) providing fabric pattern panels of at least an outer shell fabric, a barrier layer and an adhesive interposed between the outer shell fabric and the barrier layer, the outer shell fabric and the barrier layer provided as separate fabric pattern panels, the barrier layer comprising one of a moisture barrier and an insulation barrier;
(b) aligning each barrier layer fabric pattern panel to a corresponding one or more outer shell fabric pattern panels to form a plurality of composite fabric pattern panels;
(c) fusing each of the composite fabric pattern panels together, leaving an area about a perimeter of each composite fabric pattern panel unfused;
(d) forming at least one seam between the outer shell fabric pattern panels of adjacent composite fabric pattern panels along the area left unfused;
(e) folding one or more of the unfused areas of the barrier layer and the adhesive back so that the one or more unfused areas of the barrier layer and the adhesive overlap;
(f) fusing a plurality of the composite fabric pattern panels of the fabric product together to form a continuous barrier extending across an inner surface of the outer shell fabric and the at least one seam between the outer shell fabric pattern panels.

2. The process of claim 1, wherein the barrier layer comprises a membrane barrier film.

3. The process of claim 2, wherein the membrane barrier film comprises a hydrophobic polymer membrane.

4. The process of claim 1, further comprising fusing all of the composite fabric pattern panels of the fabric product together to form a continuous barrier extending across an inner surface of the outer shell fabric and the at least one seam between the outer shell fabric pattern panels.

5. The process of claim 2, wherein the membrane barrier film comprises a micro porous structure that allows transport of water vapor across the membrane barrier film while preventing or minimizing transport of liquid water across the membrane barrier film.

6. The process of claim 2, wherein the membrane barrier film includes activated carbon particles with microporous structures.

7. The process of claim 2, wherein the membrane barrier film comprises a microporous polytetrafluoroethylene, a nanoporous polytetrafluoroethylene, an expanded PTFE, a polyurethane, a cross-linked polyurethane, a polypropylene, or a polyester.

8. The process of claim 1, wherein the barrier layer is capable of withstanding a hydrostatic pressure of at least 45 psi including across the at least one seam.

9. The process of claim 1, wherein the continuous barrier is equally resistant to hydrostatic pressure across the inner surface of the outer shell fabric and the at least one seam.

10. The process of claim 1, wherein the continuous barrier is equally resistant to at least one of pathogenic microorganisms, blood borne pathogens, viruses, bacteria, liquid chemical agents, and gaseous chemical agents across the inner surface of the outer shell fabric and the at least one seam.

11. The process of claim 1, wherein the continuous barrier is equally resistant to heat loss across the inner surface of the outer shell fabric and the at least one seam.

12. The process of claim 1, wherein the barrier layer comprises an insulation material.

13. The process of claim 12, wherein the insulation material comprises a natural or synthetic filament material.

14. The process of claim 1, wherein step (c) further includes fusing an inner lining fabric pattern panel with a corresponding one of the plurality of composite fabric pattern panels and step (e) includes folding the inner lining fabric pattern panel back over the seam so that unfused areas overlap.

15. The process of claim 14, wherein the inner lining fabric comprises a fleece material or a tricot material.

16. The process of claim 14, wherein the inner lining fabric comprises multiple layers quilted together.

17. The process of claim 14, wherein the inner lining fabric comprises a polyester, a polyamide, a polyvinylchloride, a polyketone, a polysulfone, a polycarbonate, a fluoropolymer, a polyacrylate, a polyurethanes, a co-polyetherester, a polypropylene, and a co-polyetheramide.

18. The process of claim 1, wherein the adhesive comprises a powder adhesive, a web adhesive, a micro dot adhesive, a nano dot adhesive.

19. The process of claim 1, wherein the outer shell fabric comprises a polyester, a polyamide, a polyvinylchloride, a polyketone, a polysulfone, a polycarbonate, a fluoropolymer, a polyacrylate, a polyurethanes, a co-polyetherester, a polypropylene, and a co-polyetheramide.

20. The process of claim 1, wherein the outer shell fabric comprises multiple layers quilted together.

21. The process of claim 1, wherein step (d) comprises sewing or ultrasonically welding the outer shell fabric pattern panels together along the area left unfused.

22. The process of claim 1, wherein step (f) includes fusing the composite fabric pattern panels together on a three-dimensional pressing machine.

23. The process of claim 1, wherein step (f) includes fusing the composite fabric pattern panels together on a two-dimensional pressing machine.

24. The process of claim 1, wherein in step (c), fusing each of the composite fabric pattern panels together with a soft set that allows the layers to be adjusted.

25. The process of claim 1, wherein in step (c), fusing each of the composite fabric pattern panels together with a hard set that does not allow the layers to be adjusted.

26. The process of claim 1, wherein in step (e), folding the one or more of the unfused areas of the barrier layer and the adhesive back over the at least one seam.

27. A fabric product made by the process of claim 1.

28. The fabric product of claim 27, wherein the fabric product comprises an article of clothing, a portion of an article of clothing, a jacket, a coat, a parka, a raincoat, a cloak, a poncho, a shirt, a blouse, pants, shoes, boots, gloves, a hat, a hood, underwear, an undershirt, briefs, a bra, socks, a diaper, a protective suit for handling of hazardous materials, a protective suit for a firefighter, military personnel, or medical personnel, a blanket, a towel, a sheet, pet bedding, a tent, a sleeping bag, a tarp, a boat cover, carpeting, a rug, a mat, a window covering, and upholstery.

29. A process for fabricating a multi-layered fabric product comprising:

(a) providing fabric pattern panels of at least an outer shell fabric, a barrier layer and an adhesive interposed between the outer shell fabric and the barrier layer, the outer shell fabric and the barrier layer provided as separate fabric pattern panels, the barrier layer comprising one of a moisture barrier and an insulation barrier, the fabric pattern panel of the barrier layer having a configuration corresponding to at least two fabric pattern panels of the outer shell fabric seamed together;

(b) seaming the at least two outer shell fabric pattern panels together along a seam to from a flat outer shell assembly;

(c) aligning the barrier layer fabric pattern panel to the flat outer shell assembly to extend across the seam to form a composite fabric pattern panel;

(d) fusing the composite fabric pattern panel together, leaving an area about a perimeter of the composite fabric pattern panel unfused;

(e) seaming the outer shell assembly to a further outer shell piece;

(f) fusing the fabric product to form a complete fabric product having a continuous barrier extending across an inner surface of the outer shell fabric and at least one seam between the outer shell fabric pattern panels.

30. A process for fabricating a multi-layered fabric process incorporating a moisture barrier layer, comprising:

(a) providing a membrane barrier film comprising a first membrane film having a first melting temperature laminated to a second membrane film having a second melting temperature lower than the first melting temperature, each of the first membrane film and the second membrane film comprising a micro porous structure that allows transport of water vapor across the film while preventing or minimizing transport of liquid water across the film;

(b) providing fabric pattern panels of at least an outer shell fabric, the membrane barrier film, and in inner lining fabric, the outer shell fabric and the barrier layer provided as separate fabric pattern panels, the barrier layer comprising one of a moisture barrier and an insulation barrier, (c) aligning each membrane barrier film fabric pattern panel to a correspond one or more outer shell fabric pattern panels to form a plurality of composite fabric pattern panels;

(d) fusing each of the composite fabric pattern panels together at a temperature greater than the second melting temperature and less than the first melting temperature, leaving an area about a perimeter of each composite fabric pattern panel unfused;

(e) seaming the outer shell fabric pattern panels together along the area left unfused;

(f) folding the membrane barrier film and the inner lining fabric back over the seam so that the unfused areas of the membrane barrier film and the inner lining fabric overlap;

(g) fusing all of the composite fabric pattern panels together to form a complete fabric product having a continuous seamless barrier extending across an inner surface of the outer shell fabric and at least one seam between the outer shell fabric pattern panels.

* * * * *